Dec. 3, 1935.  G. J. RIEGERT  2,023,149
BLOOD COLLECTING MACHINE FOR SERUM APPARATUS
Filed July 30, 1931  2 Sheets-Sheet 1
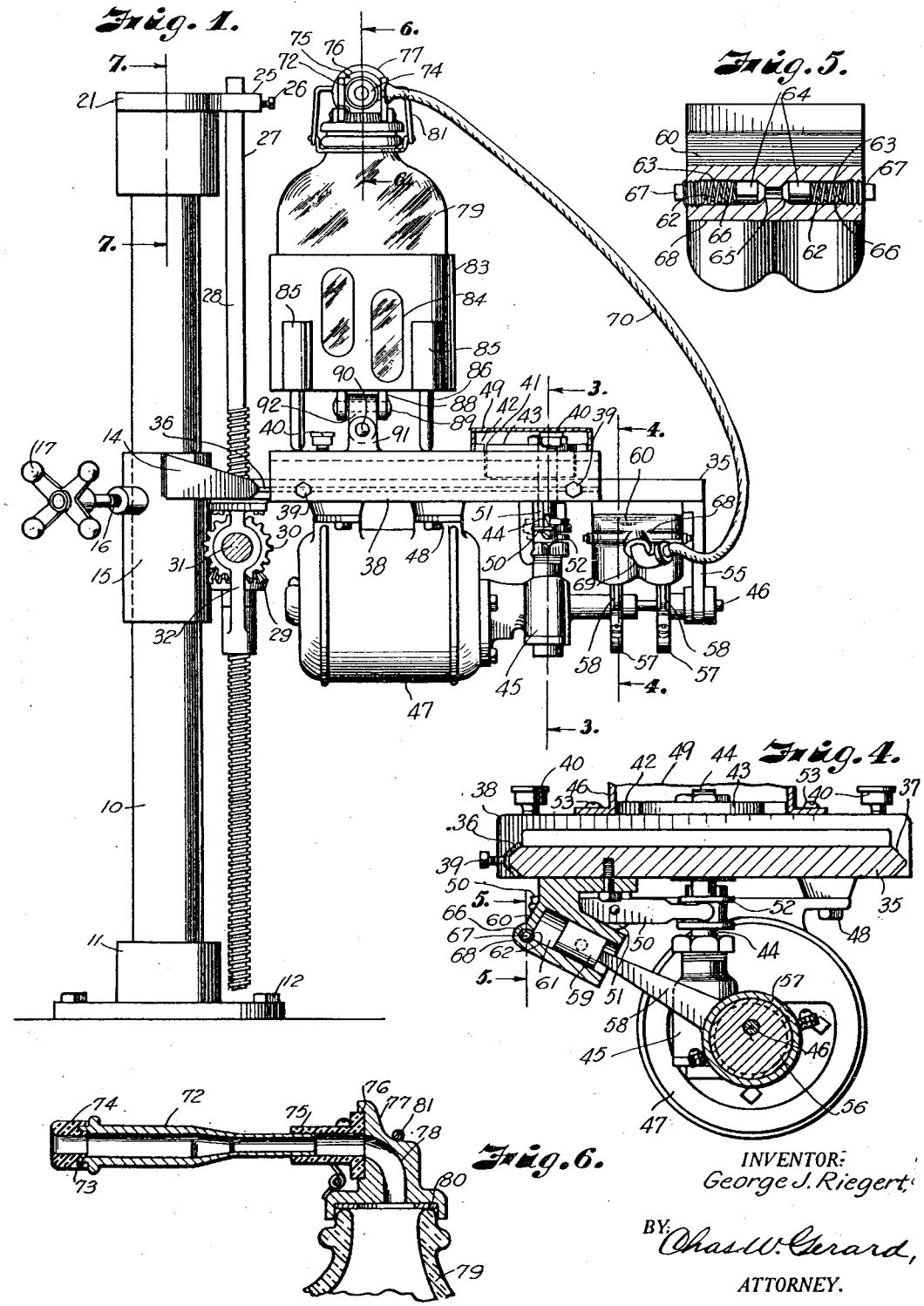
INVENTOR:
George J. Riegert,
BY Chas. W. Gerard,
ATTORNEY.

Dec. 3, 1935.  G. J. RIEGERT  2,023,149
BLOOD COLLECTING MACHINE FOR SERUM APPARATUS
Filed July 30, 1931  2 Sheets-Sheet 2
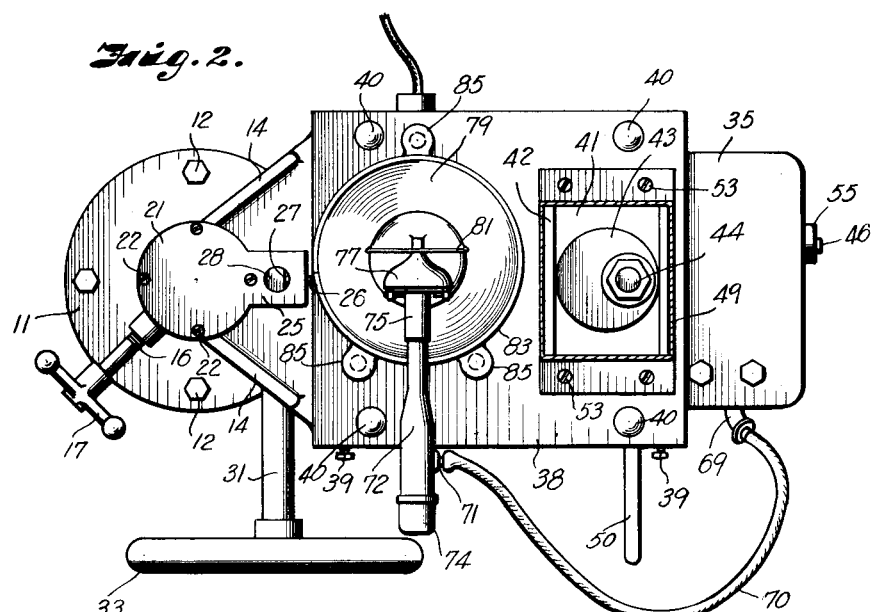
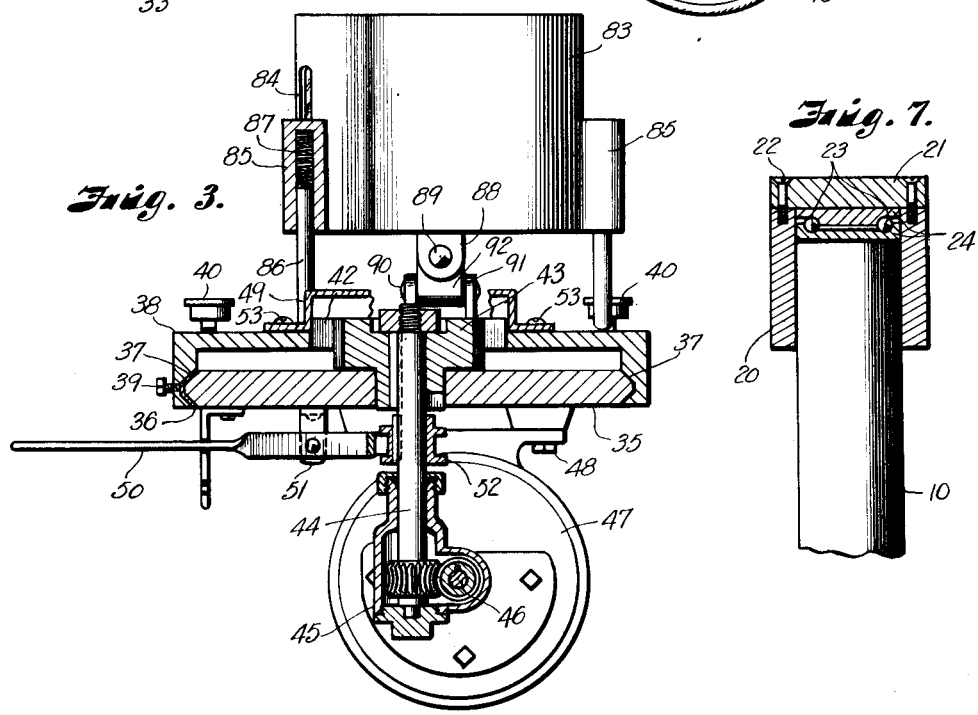
INVENTOR:
George J. Riegert,
BY Chas. W. Gerard,
ATTORNEY.

Patented Dec. 3, 1935

2,023,149

UNITED STATES PATENT OFFICE 2,023,149

BLOOD COLLECTING MACHINE FOR SERUM APPARATUS

George J. Riegert, St. Joseph, Mo.

Application July 30, 1931, Serial No. 553,918

2 Claims. (Cl. 128—276)

The present invention relates to serum apparatus, with particular reference to blood collecting appliances, designed for operation in the collection of blood from innoculated live animals for use in the preparation of serums for the treatment of live stock diseases. Accordingly, the present invention has for its primary object an improved apparatus for the more rapid and efficient bleeding of innoculated animals and the collection of the blood therefrom in a more convenient and sanitary manner than by the practices now prevailing in this industry.

As one of the important features of the invention, the improved apparatus comprises a blood collecting mechanism which is supported for universal adjusting movement to accommodate the operation to any ordinary position of the animal, together with convenient provision for effecting whatever adjustment for this purpose may be found necessary.

A further feature of the improved construction is the provision of automatic vacuum producing means, of a motor driven type, and so arranged as to exert the vacuum action as nearly as possible at the point of the blood collecting operation.

A still further important feature of the invention is the provision of a constantly acting means for maintaining a continuous agitation of the blood which has been extracted and collected, in order that such continuous agitation will insure against any undue coagulation of the blood and maintain the same in as liquid a condition as possible.

It is also an object of my invention to provide a thoroughly sanitary construction, for which purpose as little as possible travel of the blood is permitted between the point of extraction and the receptacle for its collection, and the collecting device maintained in a state of vacuum during the entire period of the collecting operation, and the parts involved in the collecting operation designed with a view to facilitating the cleaning and sterilizing of the same in the most efficient manner.

With the foregoing general objects in view, as well as various minor objects as will appear in the course of the detailed specification, the invention will now be described by reference to the accompanying drawings illustrating a type of embodiment of the improvement which has been found to be thoroughly practical and efficient, after which those features and combinations deemed to be novel will be set forth and claimed.

In the drawings—

Figure 1 is a view in side elevation, illustrating an apparatus constructed in accordance with the present invention;

Figure 2 is a plan view of the same;

Figures 3 and 4 are vertical sectional views, representing sections taken on the lines 3—3 and 4—4, respectively, of Figure 1;

Figure 5 is an enlarged detail section, representing a section on the line 5—5 of Figure 4; and Figures 6 and 7 are sectional details, representing sections on the lines 6—6 and 7—7, respectively, of Figure 1.

Referring now to the drawings in detail, these illustrate the improved apparatus as comprising a supporting standard or column 10 provided with a base casting or footpiece 11 adapted to be anchored by means of anchor bolts 12 or the like, the column 10 being of any desired height for supporting in a vertically adjustable manner a suitable bracket member 14 carried by a sleeve 15 which is slidably supported by said column 10, and provided with a clamping screw 16 fitted with an operating handle 17. This construction provides a bracket support which is not only vertically adjustable but also movable about the vertical axis of the column 10 into any desired horizontal position, in which the parts may be firmly clamped by the action of the screw 16.

For further bracing and supporting the bracket structure, as well as enabling its adjusting movements to be carried out in a convenient and efficient manner, the top of the column 10 is provided with a bearing cap structure comprising a cylindrical housing 20 and a cap plate 21 secured by screws 22 to the upper edge of the housing 20, and enclosing an end-thrust ball-bearing structure comprising the balls 23 and bearing plates 24 (see Figure 7); the plate 21 is formed with a lug extension 25 carrying a clamping screw 26 for engagement with the flat face 27 (Figure 2) of a vertical screw bar 28, with the threaded portion of which is adapted to be engaged the internal thread of a bevel pinion 29, the teeth of which engage a bevel gear 30 on a shaft 31 mounted in a bearing bracket 32 carried by the under face of the bracket 14. The screw rod 28 may be adjusted to any desired height through the gear 29 and extension 25, and fixed at this elevation by means of the clamping screw 26, and thereafter, by operation of a suitable hand wheel 33 on the shaft 31, the bracket member 14 may be readily raised or lowered to any extent to meet the operating requirements met with in the use of the apparatus.

Formed as a part of the bracket member 14 is a shelf structure 35 the opposite side edges of which are formed as guides for sliding engagement with guide channels 37 provided at the opposite sides of a table 38 designed for longitudinal reciprocating movement upon the shelf 35, one of which channels 37 may be provided with a bushing element 36 held by screws 39 for wear purposes. A set of oiling devices 40 may also be provided on the top face of said table 38, in position for lubricating the slideways (see Figures 3 and 4). For effecting the reciprocating motion of the table, the same is provided with an opening 41 having opposite cam engaging faces 42 for engagement by a cam 43 carried by the upper end of a vertical shaft 44 and connected through the speed changer 45 with the shaft 46 of a motor 47 secured, as indicated at 48, to the under face of the shelf 35, as represented by Figure 1. A lever 50 fulcrumed in a bracket 51 depending from said shelf 35 carries a suitable clutch element 52 (Figure 3) for starting and stopping the table reciprocating action by engagement or disengagement with the cam 43. A cover plate 49 may be provided for the cam opening 41 and secured to the table 38 by screws 53.

The motor shaft 46 also operates the pumping means for creating the necessary vacuum in the bleeding operation, the outer end of the shaft 46 being supported in a bearing hanger 55 depending from the end of the shelf 35, the end portion of said shaft 46 carrying a pair of eccentrics 56 provided with straps 57 and connecting rods 58. These rods 58 are connected with a pair of loosely operating pistons 59 within a pump cylinder casting 60 carried by the under face of the shelf 35, the cylinder bores 61 being connected by ports 62 (see Figure 4) with the midpoint of a bore 63 drilled through a transverse rib 68 across the cylinder head, which bore 63 contains the oppositely acting check valves 64 engaging the valve seats 65 under the action of springs 66 held in place by the screw plugs 67, as shown in Figure 5.

In communication with the space between the valves 64 is provided an air hose connection 69 carried by a suitable length of air hose 70 (Figures 1 and 2).

The other end of the air hose is attached to a nipple 71 formed on the side of a tubular device or "horn" member 72 made preferably of aluminum with a flange 73 at one end for the attachment of a rubber ring 74 for engagement at the base of the tail of the animal which is to be bled. The horn is reduced in diameter, as illustrated in Figures 2 and 6, with its smaller end adapted to engage a rubber fitting 75 flanged at one end for seating in a circular recess 76 of a casting 77 having the passage 78 providing communication between the horn, the fitting 75, and the interior of the bottle or jar 79 into which the blood is to be collected, the casting 77 being suitably recessed and fitted with a rubber gasket 80 engaging the mouth of the bottle, as shown in Figure 6. A suitable bottle cap clamping device 81 of well-known construction may be provided for securely holding the parts to the mouth of the bottle 79. It will also be noted that all the passages through the connections between the air hose 70 and bottle 79 are of a nature to be readily and efficiently cleaned, due to the absence of any pockets or recesses to which access may not be readily made for this purpose.

The bottle or jar 79 is supported within a holder 83 of appropriate shape for embracing the lower portion of the bottle and provided with suitable window openings 84 through which the extent to which the bottle is being filled may be easily observed. The lower portion of the holder is formed with bosses 85 drilled for the mounting of supporting pins 86 engaging compression springs 87 inside said bosses, as illustrated in Figure 3.

Connection is made between the bottom of the holder and the reciprocating table 38 in universal joint fashion by means of a pair of lugs 88 carrying a pin 89 pivotally connected with a pin 90 and similar lugs 91 on said table through the medium of an intermediate link 92 and with the pins 89 and 90 positioned at right angles to each other. Thus a spring support is provided for the bottle and its holder which permits not only the rectilinear motion of the bottle as imparted to it by the reciprocating motion of the table, but also any other motion which may take place in any other direction, for promoting the thoroughness of the agitating action of the contents of the bottle, for which purpose this movement of the bottle is designed.

In the operation of the apparatus, the bracket member 14 is adjusted to the desired elevation, in accordance to the height to which it is necessary to position the horn 72, which is to be applied to the tail of the animal; this adjustment is effected by turning the wheel 33 to raise and lower the bracket member along the screw rod 28. Frequently the animal, or the crate containing the same, is supported upon a table or platform, or at a lower level, as within a pit, or the like, and this means of adjustment provides for a quick and easy operation to assemble the appliance in the proper relation to the position of the animal. Moreover the shelf 35 and table 38 may be swung in either direction horizontally by loosening the screw 16 and swinging the bracket 14 about the axis of the column 10, and then reclamping the screw 16. For still higher elevations, it is of course possible to project the screw up through the lug 25 above the position illustrated, in an obvious manner. After these adjustments have been made, and the horn element 72 affixed to the animal, the motor is started, which in turn starts the pump action for producing the required vacuum conditions within the bottle through the air hose connection 70.

As soon as the blood extracted from the animal begins to collect within the bottle 79, the lever 50 may be operated to throw the clutch 52 into engagement with the cam 43, thus starting the movement of the table 38. This continuous reciprocation of the table imparts like movement to the bottle holder 83 and the method of supporting the bottle structure by means of the spring actuated pins 86, and the universal connection between the holder 83 and the table, allows the bottle a like universal movement, with the result that a continuous and vigorous agitation of the contents of the bottle is effected, to the end that the contents will be maintained in as liquid a condition as possible, without any undue coagulation of the blood which would otherwise take place.

An efficient construction of apparatus is thus provided in which the necessary vacuum action is maintained directly at the point of blood extraction, and by the same automatic operating means for maintaining the pump action as is utilized for producing the reciprocation of the table 38; in addition to which, convenient means is provided for starting the pumping or vacuum action of the blood extraction for creating the vacuum in advance of the agitating action, and thereafter by a single movement of the lever 50 initiating the agitating action by the table's movement. This arrangement and operation constitute a great improvement over prevailing methods involving laborious hand operations which cause the workmen to speedily grow tired and consequently less efficient. The improved construction also effects great economy as regards the collection of the blood, and results in a proportionately increased volume of blood collected,—this being a material item because of the expensive nature of the product. The structural details involved in the mounting of the bottle and its connection with the horn and air hose also greatly facilitate the operation of changing the bottles when necessary.

It may also be pointed out that the construction of the pump is of an improved and efficient character, for the purpose in view, and is very simple in its design, and extremely economical to manufacture.

It will thus be apparent that I have devised a practical and highly efficient motor driven automatic vacuum tail bleeding and blood collecting apparatus for the desired purpose, such as for hog cholera serum, and while I have illustrated and described what now appears to constitute the preferred form of embodiment of the various improvements set forth, I desire to reserve the right to make whatever changes or modifications may fairly fall within the scope of the appended claims.

Having thus described my invention, what I claim to be new and desire to secure by Letters Patent is:

1. Blood collecting apparatus for serum operations comprising a supporting shelf, a table movably mounted on said shelf, a receptacle provided with a holder mounted on said table and having a connection therewith and supporting means permitting universal yielding movement of the holder and receptacle relatively to the table, a vacuum-operated blood collecting device associated with said receptacle, a pumping device carried by said shelf and provided with a vacuum connection with said receptacle and collecting device, and a motor also carried by said shelf and provided with connections for operating said pump and reciprocating said table.

2. Blood collecting apparatus for serum operations comprising a supporting shelf, a table movably mounted on said shelf, a receptacle holder provided with a central bottom connection to said table, said connection including a joint permitting rocking movement of said holder about a horizontal axis, the bottom of said holder being formed with vertical recesses on opposite sides of said bottom connection, compression springs seated in said recesses, means for imparting vibratory movement to said table, and supporting pins accommodated within said recesses in engagement with said springs and with said table surface for yieldingly maintaining said holder in vertically upright position.

GEORGE J. RIEGERT.